(12) United States Patent
Lundberg et al.

(10) Patent No.: US 11,595,552 B2
(45) Date of Patent: Feb. 28, 2023

(54) DOME FOR SURVEILLANCE CAMERA

(71) Applicant: Axis AB, Lund (SE)

(72) Inventors: Ulf Lundberg, Lund (SE); Philipp Liljevall, lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 17/533,160

(22) Filed: Nov. 23, 2021

(65) Prior Publication Data

US 2022/0191351 A1     Jun. 16, 2022

(30) Foreign Application Priority Data

Dec. 11, 2020   (EP) ..................... 20213447

(51) Int. Cl.
    *H04N 5/225* (2006.01)
    *G08B 13/196* (2006.01)

(52) U.S. Cl.
CPC ......... *H04N 5/2252* (2013.01); *H04N 5/2254* (2013.01)

(58) Field of Classification Search
CPC .............. H04N 5/2251; H04N 5/2252; G08B 13/19617; G08B 13/19619
USPC ........................................................ 348/373
See application file for complete search history.

(56) References Cited

U.S. PATENT DOCUMENTS

| | | | |
|---|---|---|---|
| 6,268,882 B1* | 7/2001 | Elberbaum | ........ G08B 13/1963 348/E7.087 |
| 8,817,175 B2 | 8/2014 | Wada et al. | |
| 10,104,274 B2 | 10/2018 | He et al. | |
| 2002/0000607 A1 | 1/2002 | Pfirsch | |
| 2002/0060745 A1 | 5/2002 | Bowden et al. | |
| 2005/0276599 A1* | 12/2005 | Kajino | ................. H04N 5/2252 396/419 |
| 2012/0008935 A1 | 1/2012 | Cheng et al. | |
| 2020/0271924 A1* | 8/2020 | Abe | .................... G02B 27/0025 |

FOREIGN PATENT DOCUMENTS

| | | | | |
|---|---|---|---|---|
| CN | 110198393 A | * | 9/2019 | ................ F16F 9/30 |
| EP | 1912188 A1 | | 4/2008 | |
| EP | 2026564 A1 | | 2/2009 | |
| JP | 2006-033704 A | | 2/2006 | |
| JP | 2013-042337 A | | 2/2013 | |
| JP | 2014-048511 A | | 3/2014 | |
| KR | 20100121765 A | | 11/2010 | |
| WO | WO-2016024678 A1 | * | 2/2016 | ........... H04N 5/2252 |

OTHER PUBLICATIONS

Extended European Search Report dated Jun. 4, 2021 for European Patent Application No. 20213447.4.

* cited by examiner

*Primary Examiner* — Anthony J Daniels
(74) *Attorney, Agent, or Firm* — Volpe Koenig

(57) ABSTRACT

A dome for a surveillance camera comprises an at least partially transparent spherical portion, a front transition portion, a back transition portion, and lateral transition portions. All transition portions extend to a perimeter plane and a tangent to the spherical portion where it connects to the front transition portion has an angle α relative to a normal to the perimeter plane, as measured in a symmetry plane, and a tangent to the spherical portion where it connects to the back transition portion has an angle β relative to a normal to the perimeter plane, as measured in the same plane and the same direction as the angle α. The angle β is equal to or larger than the angle α.

4 Claims, 3 Drawing Sheets

DOME FOR SURVEILLANCE CAMERA

FIELD OF INVENTION

The present invention relates to a dome for a monitoring camera, such as for a surveillance camera.

TECHNICAL BACKGROUND

Domes have been used for monitoring cameras for decades. The dome has the dual purpose of providing a weather-protected housing for the camera arranged inside the dome, while enabling acquisition of images through the dome. Portions of the dome through which the camera collects images will have to have an adequate transparency in the wavelength regions used during the acquisition. In most applications this corresponds to a visually transparent dome, yet if the wavelength region is near infrared (NIR) or infrared, or of another wavelength region outside of the visual spectrum the dome could be visually opaque. In any case a material used for the dome could be tinted, coated or treated in other ways to obstruct view into the camera, since such obstruction would render it more difficult for an individual to see a current direction of the camera arranged therein (thus rendering it more difficult to avoid being imaged by the camera).

A disadvantage with domes, as compared to flat windows, is that light (radiation) from the outside of the dome will be refracted by the dome differently depending on which part of the dome it passes (considering a parallel set of beams approaching the camera). This will result in an optical distortion of the image, which a user most often would like to correct. For this reason, spherical domes are the most common design, having the advantage of a uniform distortion provided that an optical center of the camera is situated in the center of the spherical dome, such that the optical conditions are equal irrespective of a current orientation of the camera.

The optical requirements of the dome, both in terms of transparency and shape, makes it a comparatively expensive component. Furthermore, there is an issue in that a dome will obviously end somewhere, and at and near the edges of the dome there will be more severe optical distortions. A way around those optical distortions may be to use a more complex design of the dome, often resulting in a more complex manufacturing process, i.e., adding to the performance of the dome while also adding to the cost of it. The manufacturing could involve a more complex moulding process with an increased number of mould parts, and/or a post-moulding step, such as fusion of two or more dome parts to form the final dome.

In the patent application KR1020100121765A one suggested dome arrangement is presented, an arrangement in which the dome is arranged in a tilted fashion, similar to the arrangement of FIG. 6 of the present application, which consequently is to be considered as prior art.

Alleviating some of the problems of the existing domes by providing a uniquely shaped dome, enabling both an improved field of view and a simplified manufacturing process, as compared to present domes having such an improved field of view would be beneficial.

SUMMARY

Mitigating, alleviating or eliminating one or more of the above-identified deficiencies in the art and disadvantages singly or in any combination at least partly solve the above-mentioned problem.

To that end, the present embodiments relate to a dome for a surveillance camera. The dome comprises an at least partially transparent spherical portion, a front transition portion, a back transition portion, and lateral transition portions connecting the back transition portion and the front transition portion on either side of the dome. Furthermore, all transition portions extend from the spherical portion to a common perimeter plane and a tangent to the spherical portion where it connects to the front transition portion has an angle $\alpha > 0°$ relative to a normal to the perimeter plane, as measured in a symmetry plane, and a tangent to the spherical portion where it connects to the back transition portion has an angle $\beta$ relative to a normal to the perimeter plane, as measured in the same plane and the same direction as the angle $\alpha$. The dome is characterized in that the angle $\beta$ is equal to or larger than the angle $\alpha$, and neither the back transition portion nor the front transition portion has an inclination exceeding the angle $\alpha$.

The present design of the dome will enable an adequate view for a camera arranged inside a dome, while enabling a facilitated manufacturing procedure.

In one or more embodiments a radial center of the spherical portion is shifted in relation to the perimeter plane, in the direction of the spherical portion. Having the radial center shifted in relation to the perimeter plane offers room for a camera to be arranged in or close to the radial center and thereby a view by the camera through the partially transparent spherical portion will be consistent over a range of different orientations of the camera.

An angle of a tangent to the back transition portion is equal to or larger than 13 over the entire transition portion.

In one or more embodiments the back portion connects to the spherical portion in the tangential direction, thus providing a smooth seamless transition from the spherical shape to a straight shape. This shape is not only visually appealing, it may also better transfer a load (such as an impact) from the spherical portion down to the perimeter portion without generating a concentration of force in the way that, e.g., a sharper bend or a defined edge would.

In one or any embodiment every outer surface of the dome is visible when the dome is observed in a projection angle $\alpha$, which is another manner of expressing that there are no undercut portions in the dome, meaning that removing a finished article from a mould may be readily performed.

In several embodiments, the front transition portion, the back transition portion, and the lateral transition portions all extend down to a circular perimeter in the perimeter plane. The circular shape will facilitate mounting and sealing to a base, to rotate the dome in relation to a base, and to achieve a symmetrical design.

To further enhance the symmetrical appearance of the dome it is preferred, in one or more embodiments, that the lateral transition portions follow the same angle as the back transition portion in their connection to the spherical portion.

In one or more embodiments the front transition portion follows an angle $\theta$ in relation to a tangent to the spherical portion where it connects to the front transition portion, where $\theta$ is equal to or greater than 90° as measured in the same plane and direction as $\alpha$ and $\beta$. In this way there is less risk of the front transition portion obscuring the view of a camera arranged inside the dome. While the back transition portions and the lateral transition portions may preferably have a like shape to increase symmetry in the design, the front transition portion will have a shape following other design rules where the functionality is paramount.

To ensure a full field of view of a camera arranged inside the dome it is preferred that the angle θ exceeds 90°, so as to accommodate an extended field of view.

For reasons of symmetry it is in one or more embodiments preferred that a connection between the back transition portion and the lateral transition portion to the spherical portion follows a same height in relation to the perimeter portion.

In one or more embodiments the lateral transition portions, the front transition portion and the back transition portion define the form of a tilted cylinder, corresponding to the most basic shape fulfilling the inventive criteria. In more elaborate embodiments the back transition portion and the lateral transition portions define a frustoconical shape, again emphasizing the aspect and importance of symmetry in a monitoring camera application.

A further scope of applicability of the present embodiments will become apparent from the detailed description given below. However, it should be understood that the detailed description and specific examples, while indicating preferred embodiments, are given by way of illustration only, since various changes and modifications within the scope of the claims will become apparent to those skilled in the art from this detailed description.

Hence, it is to be understood that the embodiments are not limited to the particular component parts of the device described or acts of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects will now be described in more detail, with reference to appended figures. The figures should not be considered limiting; instead they are used for explaining and understanding.

As illustrated in the figures, the sizes of layers and regions may be exaggerated for illustrative purposes and, thus, are provided to illustrate the general structures. Like reference numerals refer to like elements throughout.

DETAILED DESCRIPTION

The present embodiments will now be described more fully hereinafter with reference to the accompanying drawings, in which currently preferred embodiments are shown. This teachings may, however, be embodied in many different forms and should not be construed as limited to the embodiments set forth herein; rather, these embodiments are provided for thoroughness and completeness, and to fully convey the scope of the claims to the skilled person.

Figure 1:
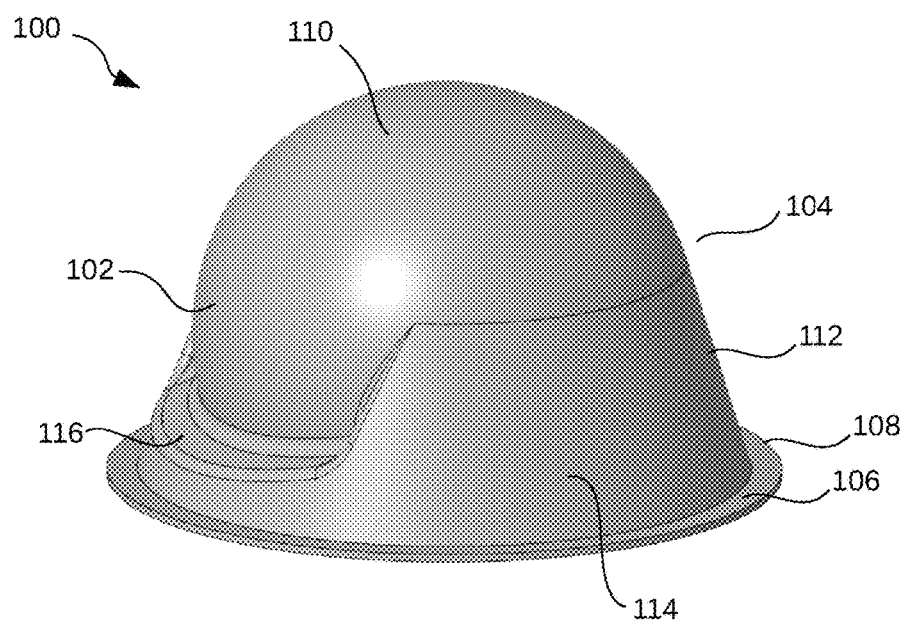
FIG. 1 is a perspective view of a dome according to a first embodiment.

The inventive dome, of which an embodiment is shown in FIG. 1, has a shape facilitating an adequate view for a camera being mounted inside the dome, as well as a simplified moulding process. It may be noted that even though FIG. 1 illustrates one embodiment, the following text will contain information regarding parameters that may be altered for the realization of the further embodiments. The dome 100 has a front side 102 and a back side 104, and a shape being symmetrical around a central vertical plane (the plane depicted in FIG. 2). The dome 100 is designed to house a camera (not shown), in a fashion normal for dome cameras, and areas of the dome through which the camera is expected to acquire an image are spherical and transparent (for the wavelength region to be captured by the camera, normally visual and near-infrared). The dome extends down to a perimeter plane 106, where it will connect to a base during assembly. The perimeter 108 is in the illustrated embodiment circular, which is practical since the dome will be designed to rotate with the camera, and since it will increase the symmetry of the dome 100 when viewed from different angles. The front side 102 forms part of a spherical shape 110 extending to the back side 104 where a back transition portion 112 connects the spherical shape 110 with the perimeter, and the back transition portion connects to lateral transition portions 114 on either side thereof, back to the front side, as well as provides a transition to the perimeter plane 106. There is also a front transition 116 region having a different shape from the rest of the transition (the back transition portion 112 and the lateral transition portion 114), for enabling a full camera field of view. As will be detailed later, the dome 110 may be formed in a single piece or from multiple parts in a multi-component moulding process or in a multi-stage moulding process.

Figure 2:
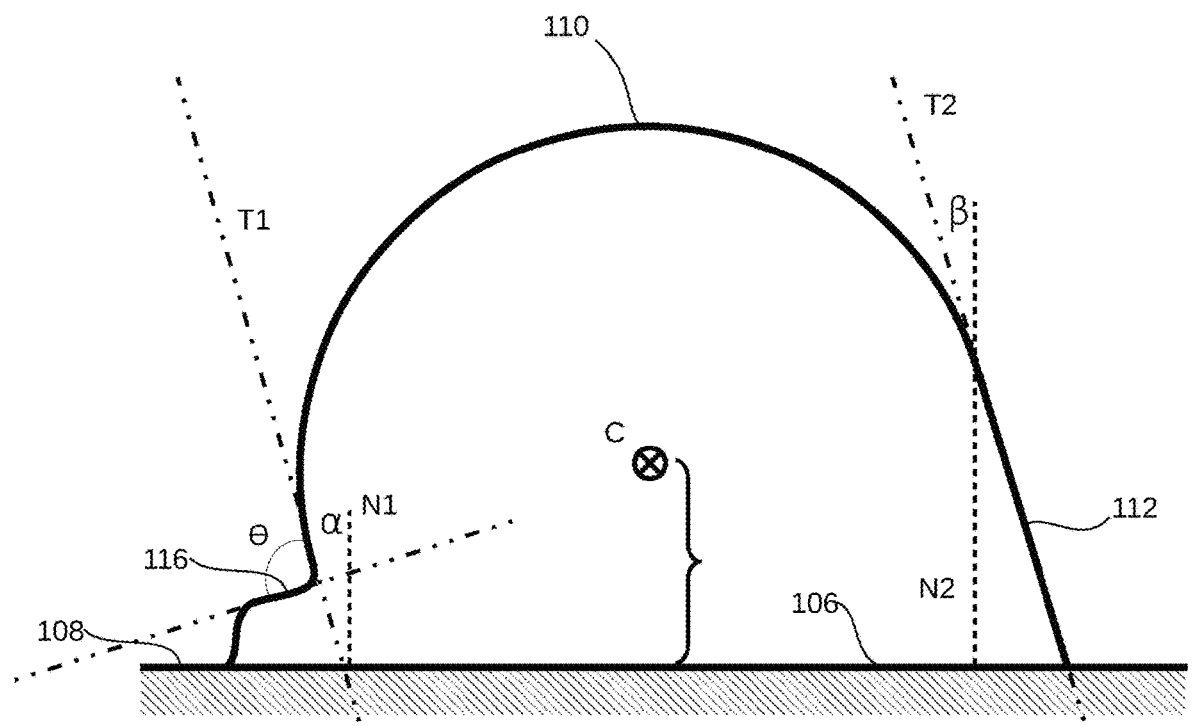
FIG. 2 is a schematic section of a dome according to the first embodiment.

To better describe how these effects are achieved, we will temporarily leave FIG. 1 and refer to the schematic view of FIG. 2. FIG. 2 basically is a line drawing illustrating the shape of the dome 100 in the aforementioned symmetry plane. In a situation where the dome would be asymmetric, for whatever reason, the symmetry plane could be translated to a center plane of the spherical portion. For simplicity the same reference numerals are used to denote corresponding parts, even though they are not given the exact name (e.g., instead of a "region" or "area" corresponding numerals are used to refer to "segments" in FIG. 2, it being a section rather than a perspective view). In this plane the dome is construed by three operational segments. The first operational segment is a circular arc 110, corresponding to an intermediate segment in later embodiments. This circular arc 110 will enable for a camera having its imaging function in the center of the arc (as is the usual position in a dome camera) to maintain an undistorted (or at least equally distorted) view over a tilt angle range. In a front end of the circular arc there is a front transition segment 116 extending from the one end of the circular arc 110 down to a perimeter 108, and in the back end of the circular arc there is a back transition segment 112 extending from the other end of the circular arc to the perimeter 108, wherein the perimeter is situated in a perimeter plane. The perimeter plane, which is worth mentioning, is only an abstraction for better understanding of the dome shape. In the final dome-camera product the dome will in most situations be attached to a base serving as a platform for necessary electronics and mechanics. Examples of this are amply present in prior art, for someone interested to look at further, but since the present embodiments relate mainly to the shape of the dome we will not discuss it any further here. Obviously, "front" and "back" could be replaced with "first" and "second" and the words are simply used to facilitate the understanding of the schematic drawing. A first tangent T1 to the circular arc 110 may be defined where it connects with the front transition segment 116 and a second tangent T2 to the circular arc 110 may be defined where it connects to the back transition segment 112. The first and the second tangent T1 and T2 are both arranged at an angle in relation to the perimeter plane and are inclined in the same direction in relation to a normal of the perimeter plane. The effect of the inclination is that a camera arranged inside the dome will be able to obtain a field of view extending past a horizontal line (in an embodiment where the perimeter plane is a horizontal plane—such as a ceiling) when looking through the front of the dome. Being able to obtain this inclination of the first tangent is an effect of that a geometrical center C of the circular arc segment (i.e., the center of the circle of which the arc segment form a part) is offset from the perimeter plane 106, in the direction of the arc segment 110.

It has thus been explained how the shape of the dome facilitates an adequate view, at least in one dimension), and effects relating to a moulding process will follow. These effects are intimately coupled to the angles in relation to the tangents. The first tangent will be inclined at an angle $\alpha$ in relation to a normal N1 of the perimeter plane, and the second tangent will be inclined at an angle $\beta$ in relation to the same normal N2 (same in the meaning "parallel to N1"). According to the present embodiments, these angles may be the same, OR, the angle $\beta$ may be greater than the angle $\alpha$. Furthermore, no part of the front or back transition segment may be inclined at an angle greater than the angle $\alpha$ as measured in the same plane. In this way, there will be no undercut portions of the dome 100, meaning that when produced by means of moulding (e.g., injection moulding or compression moulding) there will be no obstacles when ejecting (or demoulding) the moulded dome from the mould cavity. A resulting criterion for the circular arc is that it may not extend beyond a semicircle (i.e., not greater than 180 degrees), and the same goes for the corresponding sphere, it may not be more complete than a hemisphere. Another way of expressing the criterion is that when viewed in a projection angle $\alpha$ (or a greater angle), every surface of the dome should be visible, or at least not hidden, also defining that a mould without any undercut portions may be accomplished.

Notably, and as clarified by the discussion concerning projection angle and visibility: the criteria set up for the symmetry plane will also be true for any other plane of the dome in the sense that there can never be any undercut portions. The specific values for $\alpha$ and $\beta$ may and will vary for different sections, if at all present (consider a small section close to the perimeter of the dome, parallel to the symmetry plane and essentially only comprising a cut from the lateral connection portion, i.e., a frustoconically shaped section). There are two straightforward ways of defining angles and use of the symmetry plane and sections parallel to the symmetry plane may be appropriate when discussion the properties of the spherical portion at the front of the dome etc. For other portions of the dome it may be more appropriate to relate to sections in planes extending through a centerline of the dome, orthogonal to the perimeter plane, referred to as "radial planes" in the following. The centerline extends through the geometrical center C, orthogonal to the perimeter plane. In these radial planes there is still the general conditions of not generating any undercut portions to fulfill, but as seen in the drawings this is less of an issue to achieve, mainly since the spherical portions and the transitional portions will not have to be optimized in regard of a camera view through the dome.

It is preferred that the back transition segment 112 connects to the arc segment in the angle of the second tangent T2, such as to provide a continuous transition where any effects of load focusing are minimized (as compared to a situation where the two segments meet at a more defined bend.

FIG. 2 also includes an angle $\theta$, which indicated an angle of a portion of the front transition segment in relation to the tangent T1. It is preferred that the angle $\theta$ is equal to or exceeds 90°, i.e., that the aforementioned portion has an inclination corresponds to a prolonged radius extending through the center C or is even further inclined. In this way the field of view of a camera arranged inside the dome may be accounted for, such that the front transition segment 116 does not obscure the view. This feature may be beneficial for several various setups (dome and camera combinations) but it is not an essential feature as such. In the general situation the shape of the front transition segment (and front transition portion) should merely provide a transition between the spherical portion and the perimeter portion, and in many embodiments preferably to the circular perimeter. The shape illustrated in the drawings of the present application is also governed by the wish to maximize the rotational symmetry to the greatest possible extent, meaning that the part of the front transition segment closest to the perimeter portion should have a shape similar to that of the back transition portion in the corresponding position (e.g., following the same angle in a radial plane). The shape of the aforementioned portion (discussed in relation to the angle $\theta$) is preferably set by the field of view of the camera, and since the same is true for the transition point (i.e., this point is preferably set by the field of view of the camera) between the spherical portion to the front transitional portion, the condition that angle $\theta$ is equal to or exceeds 90° follows.

Another effect of the dome shape in relation to the moulding is an added bonus in having a designated front and a designated back, in that the injection points (essentially the moulding process) may be optimized to provide excellent optical qualities in the front of the dome while it will be less important for other portions of the dome.

Figure 3:
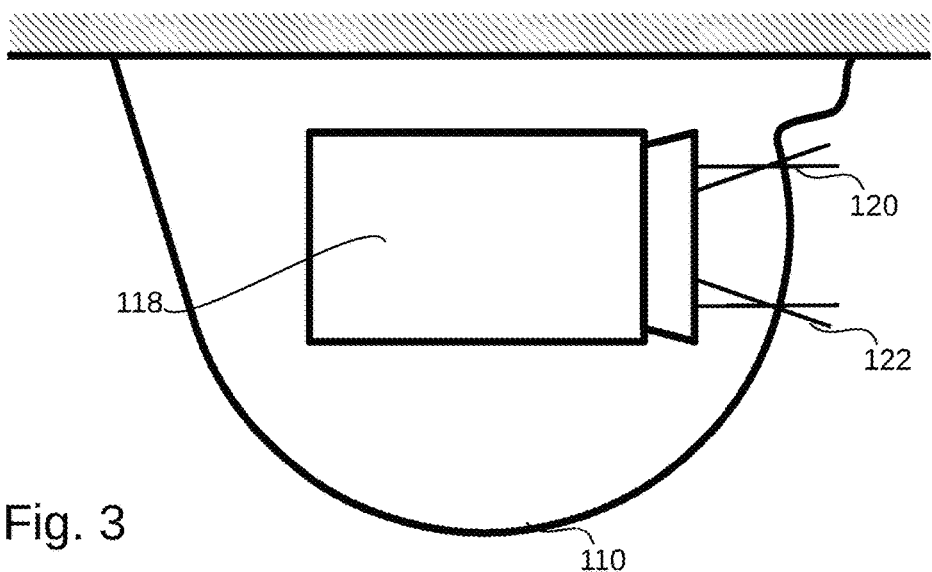
FIG. 3 is a sectional view of a dome according to the first embodiment, when having a camera arranged inside the dome.

Leaving the two-dimensional view of FIG. 2 the picture becomes a bit more complex, and the intended use of the dome may be described to better illustrate the constructional parameters. This will be done referring to FIG. 3. FIG. 3 is a sectional view similar to FIG. 2, yet of a more complete embodiment with a schematic camera arranged within the dome. Apart from the components of FIG. 2, FIG. 3 also includes a camera 118. The camera 118 includes imaging optics, obviously, and the beams 120 and 122 indicate how the field of view may range, e.g., as an effect of different zoom settings. In some dome cameras a camera may pan and tilt freely below a static dome, in which case it is imperative that the dome is fully symmetric, which usually corresponds to the dome having a semispherical shape. For the purposes of the present embodiments, however, the camera 118 will only by allowed to tilt in relation to the dome 102 (i.e., to move in the plane illustrated in FIG. 2) and in most embodiments it will not be allowed to pan (i.e., not rotate in the horizontal direction) at least not to any major extent. During panning, the dome will move along with the camera, such that the camera does not pan in relation to the dome.

The effect is that for several embodiments the intermediate segment 110 will only need to have a defined shape in a small area extending on each side of a centerline. The dimensions of this "small area" will be defined by the field of view of a camera 118 (may also be defined as the view angle) arranged in the dome, and in a practical application it will be defined by the largest view angle for a camera inside the dome, indicated by the cone 122 in FIG. 3. It has already been defined that the intermediate segment 110 follows a circular arc in one direction, and due to the desire for symmetry and minimized and consistent image distortion the intermediate section will also follow an identical circular arc (a circular arc with the same radius) in all other directions, i.e., the intermediate portion may be a cutout of a sphere. This is shown in FIG. 4 and explains the shape of the intermediate segment 110 in all dimensions.

Figure 4:
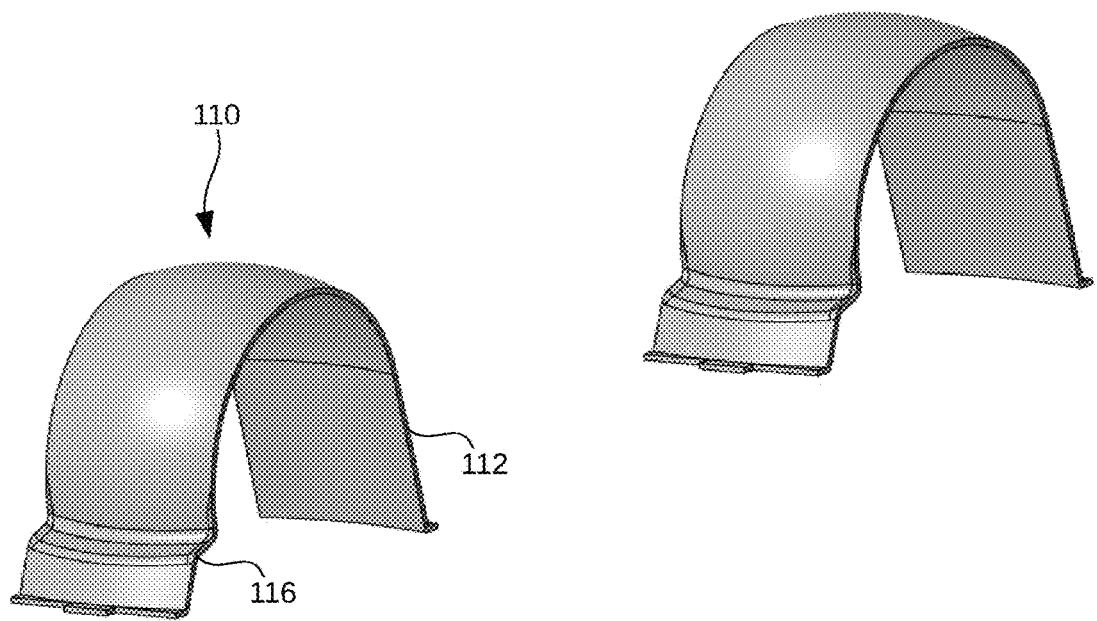
FIG. 4 is a perspective view of a transparent portion of a dome, which could be used for a dome in accordance with the first embodiment.

FIG. 4 also shows the respective shape of the back 112 and front 116 transition portions. These shapes are of less importance since the design is intended to prevent the camera view from accessing these areas (meaning that distortion in terms of refraction is not a factor to consider). The main criterion is still that there should be no undercut portions, i.e., all surfaces should be visible in a projection along the angle α (or at least between α and β) in a symmetry plane (mirror plane) of the dome. Furthermore, in the example of FIG. 4 it is visible how the front transition portion 116 is shaped not to interfere with the view of the camera, i.e., it slopes continuously towards the perimeter 106.

The back transition portion 112 may also have any shape within the set parameters. For simplicity and convenience, it may, however, suitably be given a frustoconical shape, e.g., extending in the direction of the second tangent, resulting in a smooth transition between the portions.

It may also be added that in most embodiments the perimeter 106 will form a circle, for increased symmetry, meaning that both the front and the back transition segment/portion will extend from the intermediate segment/portion to different parts of the same circular perimeter 106. A circular shape of the perimeter is not an essential feature, but there are advantages relating to how it simplifies rotational motion in relation to a base on which the dome may be arranged, apart from the increased symmetry.

A further criterion is related to the particular use for which the dome is intended, namely surveillance. For a dome camera there is an added benefit if the orientation of a camera inside the dome is obscured. Since the present dome is non-symmetrical in that the front of the dome differs from the back and the lateral sides, the front of the dome—and therefor a probable orientation of the camera—may become more obvious, which is clearly visible in FIG. 1. The shape of the back transition segment/portion may for this reason be mimicked all around the camera in the lateral transition portions, that is, in every portion not being the front transition (nor the intermediate segment), which is also shown in FIG. 1 (again, see FIG. 1). This would correspond to the front transition portions and the lateral transition portions having the same shape (such as the same angle in the most straightforward embodiment) when viewed in their respective radial plane.

In the front of the dome, as seen in FIG. 1, where the front transition portion connects the intermediate segment to the perimeter and to the back transition segment (or the area shaped as the back transition segment) something that could be called a viewing window is formed. The portion where the front transition segment connects to the perimeter has been described, yet also the shape of the lateral sides of this window will be defined by the expected field of view of a camera arranged within the dome. More specifically, and as shown in, e.g., FIG. 1, these sides will be slanted outwardly so as to minimize the risk of obscuring portions of the field of view.

The entire dome, as shown and defined thus far, may readily be formed in one piece in a two-piece mould, with facilitated demoulding.

Figure 5:
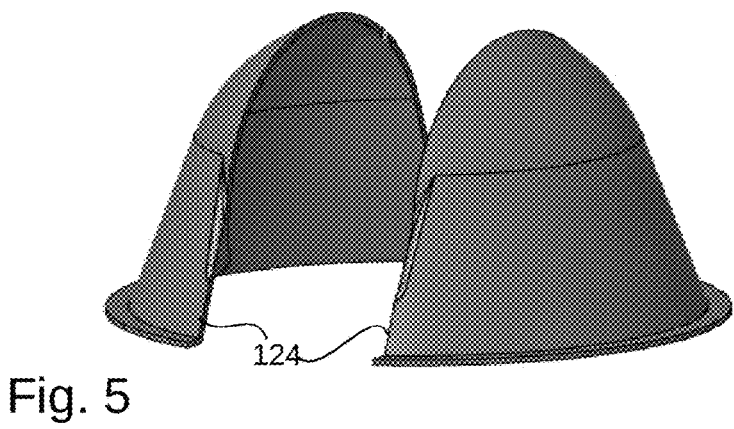
FIG. 5 is an exploded view of different parts that could be used in a dome according to the first, or other, embodiments.

FIG. 5 illustrates an exploded view of a dome according to another embodiment. This embodiment, too, may be formed in a two-part mould, yet it will be a multicomponent moulding. The finished dome will consist of three different parts of which two may be arranged in the mould prior to injecting the material for the transparent portion.

The two side parts 124 are essentially visually opaque but IR-transparent parts that will allow IR-radiation from IR-illumination sources arranged within the dome to illuminate the field of view of the camera. It is obvious from the FIG. 5 that these two parts also include portions of the spherical portion. Further parts may be added in a similar manner, required. All parts may be formed from the same base material, wherein additives define the properties of the different parts.

The two side parts may be formed in a first or second stage of a two-stage moulding process as the dome is fabricated, which reduces the handling of separate components at the cost of a slightly more complex, yet still straightforward, moulding process. The materials used in the different parts will have to be compatible so as to fuse together during the moulding process, to the extent necessary. In the most straightforward example, all components are made from the same base material, polycarbonate plastic, while additives give the desired properties. Any material used for camera domes today may be a viable option for the present disclosure, polycarbonate plastic, acrylic plastic, etc. and apart from that the material used is not an essential part of the present disclosure per se. The material for the spherical portion will have to be transparent in the relevant wavelength region, to be a viable choice, and mouldable in order to obtain the full advantages of the shape. Injection moulding is one possible method, preferred for the illustrated embodiments, but compression moulding, blow moulding or other moulding methods are not ruled out, since they all could include the demoulding step. In an alternative embodiment the side parts may be prefabricated and arranged in the mould. Following that, the mould is closed and the material of the transparent portion is injected. The moulding process will fuse all parts together to a single component, which will simplify assembly of the final product and improve sealing properties for the same.

Obviously, the side parts 124 may be eliminated from the process as individual components, meaning that the entire dome could be moulded in a single stage and of a single material. Furthermore, specific properties of different portions of the dome may be achieved during post-moulding processes, such as coating, painting, abrasion, etching, etc.

Figure 6:
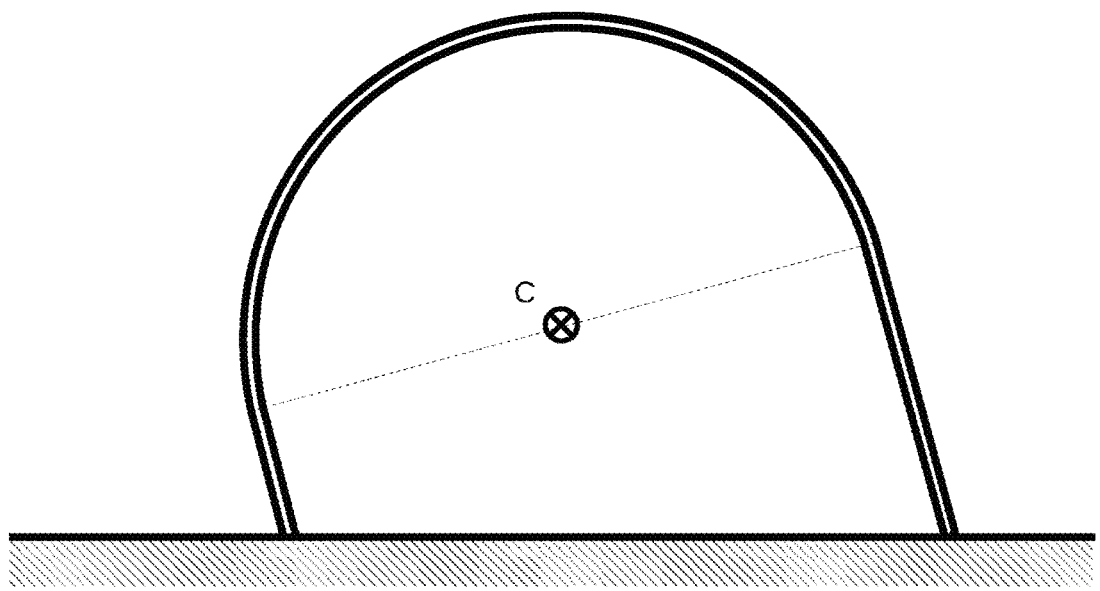
FIG. 6 is a schematic section of a dome according to a second embodiment.

FIG. 6 is a schematic view of a rudimentary version of the inventive dome. It basically consists of two geometrical shapes; a sphere arranged at one end of a cylinder, both shapes having the same diameter. The cylinder is cut in a slanted angle along a plane. As compared to the more refined embodiments this simplified one will have a more asymmetrical shape and its perimeter will not be circular.

Figure 7:
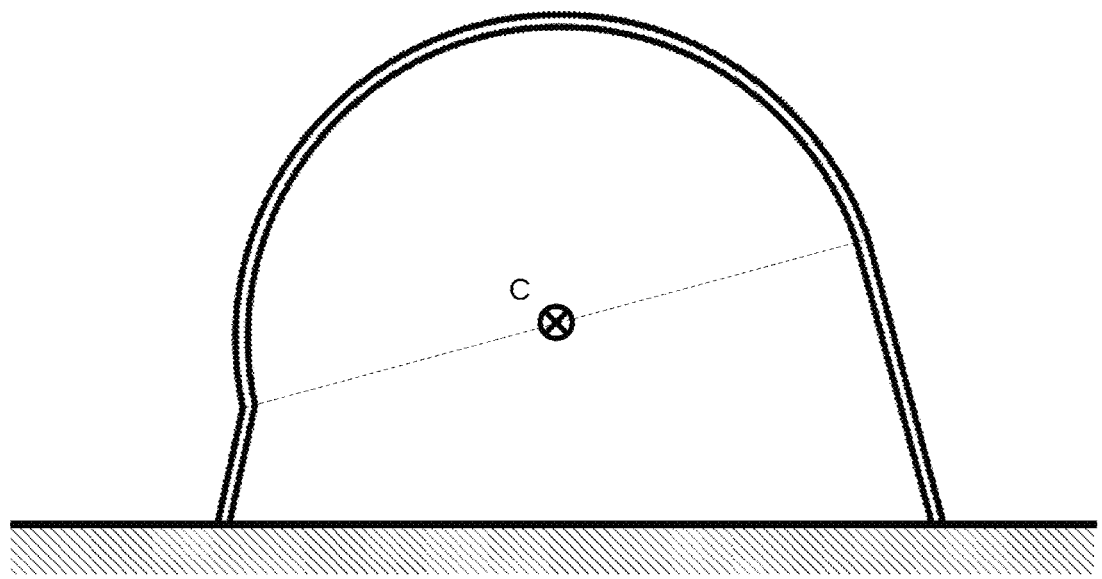
FIG. 7 is a schematic section of a dome according to a third embodiment.

In FIG. 7 the cylinder of FIG. 6 is replaced by a frustoconical portion as a further intermediate evolution from the general idea towards a valid product.

The invention claimed is:

1. A dome for a surveillance camera, said dome comprising an at least partially transparent spherical portion, a front transition portion, a back transition portion, and lateral transition portions connecting the back transition portion and the front transition portion at two sides of the spherical portion, wherein each of the front transition portion, the back transition portion, and the lateral transition portions extend to a common circular perimeter plane and wherein:

- a tangent to the spherical portion where the spherical portion connects to the front transition portion has an angle $\alpha > 0°$ relative to a normal to the perimeter plane, as measured in a symmetry plane and in a direction away from a radial center of the spherical portion;
- a tangent to the spherical portion where the spherical portion connects to the back transition portion has an angle $\beta$ relative to a normal to the perimeter plane, as measured in the same plane and in a direction toward the radial center of the spherical portion, the angle $\beta$ is equal to or greater than the angle $\alpha$; and
- the lateral transition portions have the same height as the back transition portion relative to the perimeter plane, such as to define a frustoconical shape.

2. The dome of claim 1, wherein a radial center of the spherical portion is shifted in relation to the perimeter plane, in the direction of the spherical portion.

3. The dome of claim 1, wherein an angle $\theta$ between the front transition portion and the tangent to the spherical portion where the spherical portion connects to the front transition portion is equal to or greater than 90° as measured in the same plane and direction as $\alpha$.

4. The dome of claim 3, wherein the angle $\theta$ exceeds 90°, so as to accommodate an extended field of view of a camera arranged inside the dome.

* * * * *